United States Patent [19]
Katz

[11] Patent Number: 5,402,750
[45] Date of Patent: Apr. 4, 1995

[54] WATER DELIVERY ASSEMBLY PARTICULARLY USEFUL FOR POULTRY DRINKERS

[75] Inventor: Oded Katz, Doar Na Menashe, Israel

[73] Assignee: Plassom Maagan Michael Industries Ltd., Doar Na Menashe, Israel

[21] Appl. No.: 193,509

[22] Filed: Feb. 7, 1994

[30] Foreign Application Priority Data

Jul. 2, 1993 [IL] Israel .................... 106215

[51] Int. Cl.6 ............................................. A01K 7/00
[52] U.S. Cl. ................................. 119/72.5; 251/339
[58] Field of Search .................. 119/72.5, 75; 251/339

[56] References Cited

U.S. PATENT DOCUMENTS

| | | | |
|---|---|---|---|
| 3,566,844 | 3/1971 | Occhiodori | 119/72.5 |
| 4,187,804 | 2/1980 | Taschitzki | 119/72.5 |
| 4,284,036 | 8/1981 | Hostetler | 119/72.5 |
| 4,370,948 | 1/1983 | Atkins | 119/75 |
| 4,589,373 | 5/1986 | Hostetler et al. | 119/72.5 |
| 4,610,221 | 9/1986 | Steudler, Jr. | 119/72.5 |
| 4,660,509 | 4/1987 | Steudler, Jr. | 119/72.5 |
| 5,003,927 | 4/1991 | Thompson | 119/72.5 |
| 5,074,250 | 12/1991 | Clark, IV | 119/72.5 |
| 5,193,485 | 3/1993 | Hostetler | 119/72.5 |

*Primary Examiner*—Paul J. Hirsch
*Attorney, Agent, or Firm*—Benjamin J. Barish

[57] ABSTRACT

A water delivery assembly for attachment to a pressurized water supply pipe particularly useful for supplying drinking water to poultry, includes a housing having an elongated flow passageway between its inlet and outlet restricting the water flow through the outlet, and thereby permitting the assembly to be used with water supply pipes supplying water at a relatively high pressure.

18 Claims, 2 Drawing Sheets

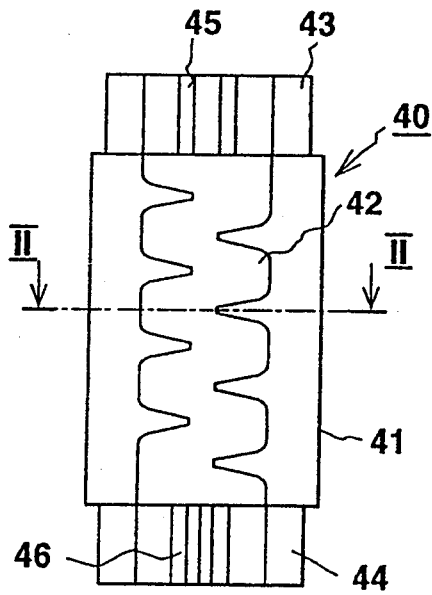
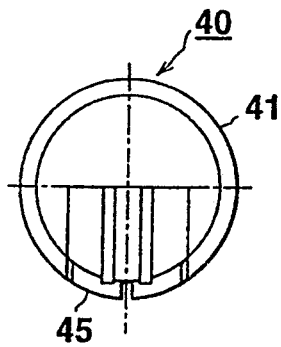
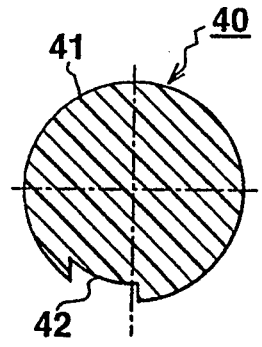
FIG. 3    FIG. 4    FIG. 5
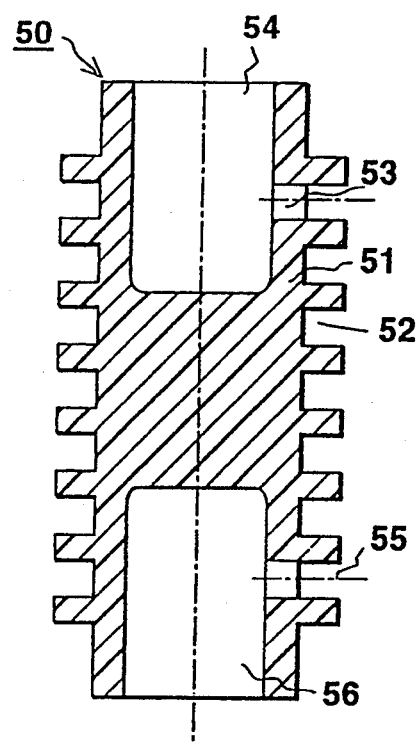
FIG. 6

WATER DELIVERY ASSEMBLY PARTICULARLY USEFUL FOR POULTRY DRINKERS

FIELD AND BACKGROUND OF THE INVENTION

The present invention relates to water delivery assemblies for attachment to a pressurized water supply pipe. The invention is particularly useful for nipple-type water delivery assemblies used in supplying drinking water to poultry, and the invention is therefore described below with respect to this application.

A wide variety of nipple assemblies have been developed for attachment to a pressurized water supply pipe for supplying drinking water to poultry. Generally, these nipple assemblies comprise a housing having an inlet receivable within the pressurized water supply pipe, an outlet, and a valve opening circumscribed by a valve seat between the inlet and outlet. A valve member normally seated on the valve seat blocks the flow of water via the valve opening to the outlet; and a pin extending externally of the housing is engageable by poultry for moving the valve member to produce a flow of water through the outlet.

In the known constructions of nipple assemblies for poultry drinkers, the water supply pipe generally supplies water to the nipple assembly at a relatively low pressure to prevent an excessive flow of water from the outlet when the poultry moves the pin. As a result, the water supply pipe is very sensitive to changes in elevation, so that if there is any significant change in the elevation of the water supply pipe, pressure regulators must be provided at frequent intervals to maintain a relatively low pressure at each nipple assembly. The need for many such pressure regulators significantly increases the cost of installation of the system, as well as the cost of its maintenance and repair.

OBJECTS AND BRIEF SUMMARY OF THE INVENTION

An object of the present invention is to provide a nipple assembly for attachment to a pressurized water supply pipe, particularly one useful for supplying drinking water to poultry, which nipple assembly has advantages in the above respects.

According to the present invention, there is provided a water delivery assembly for attachment to a pressurized water supply pipe particularly useful for supplying drinking water to poultry, comprising: a housing having an inlet receivable within the pressurized water supply pipe for inletting water therefrom, an outlet for outletting water from the housing, and a valve opening circumscribed by a valve seat between the inlet and outlet; a valve member normally seated on the valve seat to block the flow of water via the valve opening to the outlet; and a pin passing through a ledge in the housing with one end of the pin extending externally of the housing so as to be engageable by poultry for moving the valve member to an open position. The opposite end of the pin has an enlarged head seatable on the ledge, and a narrow portion between the head and the externally-extending end of the pin defining a clearance flow passageway between the inner surface of the ledge and housing and the outer surface of the pin. Thus, when the externally-extending end of the pin is engaged by a poultry to cause the enlarged head of the pin to unseat from the ledge and to move the valve member to its open position, this produces a flow of water via the clearance flow passageway to the housing outlet characterized in that the housing further includes an elongated flow passageway of longer length than said clearance flow passageway between the inlet and the outlet restricting the water flow through the clearance flow passageway, and thereby permitting the water delivery assembly to be used with water supply pipes supplying water at a relatively high pressure.

A system using such a water delivery assembly is much less sensitive to changes in elevation in the water supply pipe, and obviates the need for pressure regulators at frequent intervals even when there are significant changes in elevation. Accordingly, such a system may be installed, maintained, and repaired, at significantly less cost than the conventional systems requiring relatively lower water pressures in the supply pipe.

According to further features in the preferred embodiments of the invention described below, the elongated flow passageway is defined by a flow restrictor element inserted into said housing inlet. Such a flow restrictor element may be of the type commonly used in drip irrigation emitters to reduce the flow of a pressurized water supply line to a trickle as the water is outletted from the water supply line.

According to one described embodiment of the invention, the elongated flow passageway is in the form of a labyrinth extending the length of the flow restrictor element; and in a second described embodiment, the elongated flow passageway is in the form of a helical groove extending helically around the periphery of the flow restrictor element.

Further features and advantages of the invention will be apparent from the description below.

BRIEF DESCRIPTION OF THE DRAWINGS

The invention is herein described, by way of example only, with reference to the accompanying drawings, wherein:

FIG. 3 is a side elevation view illustrating the flow restrictor element in the water delivery assembly of FIG. 2;

FIG. 4 is a top plan view of the flow restrictor element in FIG. 3;

FIG. 5 is a transverse sectional view, along line V—V of FIG. 3;

and FIG. 6 is a longitudinal sectional view illustrating a second form of flow restrictor element that may be used in the water delivery assembly of the present invention.

DESCRIPTION OF PREFERRED EMBODIMENTS

Figure 1:
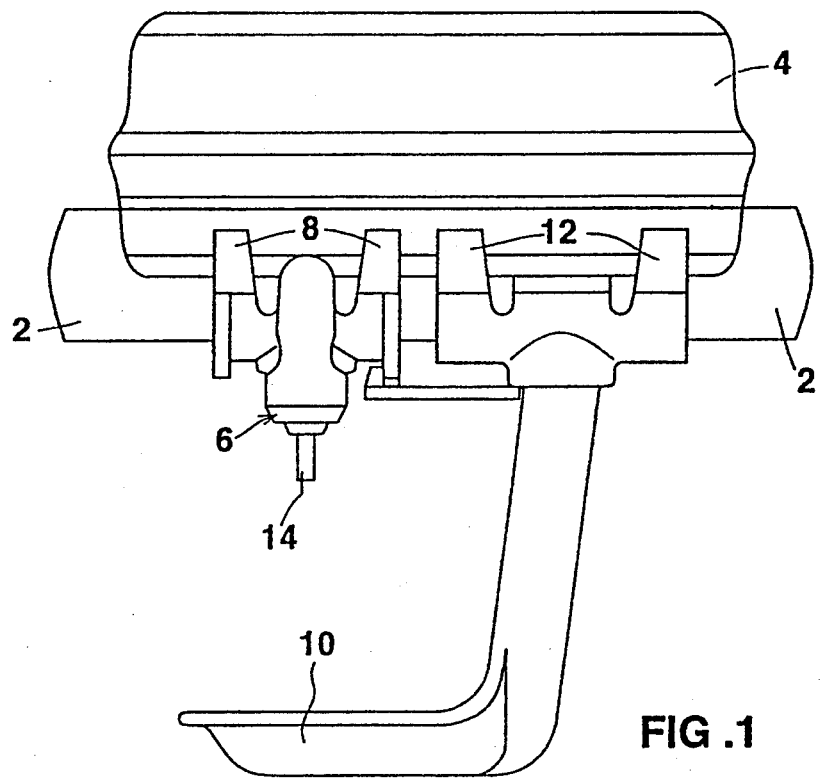
FIG. 1 illustrates one form of poultry drinker including a water delivery assembly constructed in accordance with the present invention.

The poultry drinker illustrated in FIG. 1 comprises a water supply pipe 2 which is supported in suspension by a plurality of suspension members 4 (one of which is shown in FIG. 1) spaced along the length of the pipe. A nipple-type water delivery assembly, generally designated 6, is attached to the pipe 2 at periodic intervals by means of a saddle clamp 8. A nipple cup 10 is attached to the water supply pipe 2 by another saddle clamp 12 to underlie the nipple assembly 6 and to receive excess water outletted from it.

As well known in such poultry drinkers, the nipple assembly 6 normally blocks the flow of water from the water supply pipe 2 through the outlet of the nipple assembly, but when the poultry engages a pin 14 depending from the nipple assembly, a valve within the nipple assembly is caused to open to outlet a small quantity of water for drinking by the poultry. The nipple cup 10, which accumulates any excess water not drunk by the poultry, may be omitted.

Such poultry drinkers are well known, and various types of nipple assemblies have been devised to outlet a small quantity of water to the nipple cup 10 upon engagement of the pin 14 by the poultry. As pointed out earlier, however, the previously known nipple assemblies are supplied with water at a low pressure in order to prevent an excessive flow of water from the nipple assembly when its pin 14 is tilted or lifted by the poultry, and therefore such previously known poultry drinker systems were very sensitive to changes in elevation along the length of the water supply pipe, and required pressure regulators at frequent intervals if there was any significant change in the elevation.

Figure 2:
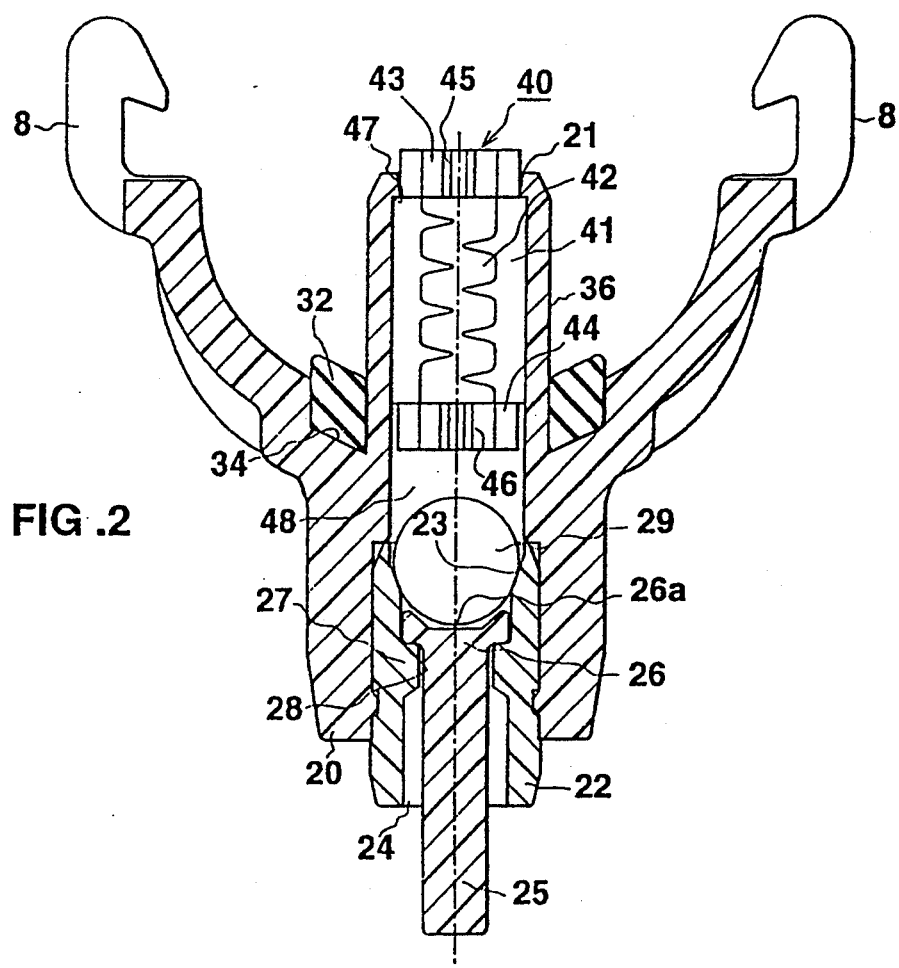
FIG. 2 is an enlarged longitudinal sectional view illustrating the water delivery assembly in the poultry drinker of FIG. 1.

FIG. 2 illustrates the construction of the novel nipple assembly 6 which enables the nipple assembly to be used with water pipes supplying water at relatively high pressures, thereby making the installation much less sensitive to changes in elevation, and also obviating the need for pressure regulators at frequent intervals.

As shown in FIG. 2, the nipple assembly 6 includes a housing 20 having an inlet 21 at one end which is receivable within the water supply pipe 2 for inletting water into the housing. The opposite end of housing 20 is fitted with a sleeve 22 whose inner end defines a conical valve seat 23, and whose outer ends extends externally of housing 20 and defines an outlet 24 for the housing. Sleeve 22 receives a pin 25 whose inner end is formed with an enlarged head 26 normally supported on an annular ledge 27 formed in sleeve 22. The opposite end of pin 25 extends externally of housing and is of a diameter less than that of the inner diameter of the housing sleeve 22 so as to provide a clearance flow passageway 28 with respect to the inner surface of housing ledge 27, as well as the inner surface of housing sleeve 22 depending below ledge 27.

Housing 20 further includes a ball 29 which normally rests on valve seat 23 to block the flow of water through sleeve 27 and outlet 24 of housing 20. However, ball 29 is aligned with a recess 26a in the enlarged head 26 of pin 25, such that when the pin is tilted or lifted by poultry, the side of the recessed portion 26a of head 26 unseats the ball from the valve seat 23, and thereby permits the flow of water via the clearance 28 of the nipple assembly to and through the housing outlet 24.

The nipple assembly 6 illustrated in FIG. 2 further includes an circular sealing ring 32 received within an annular groove 34 circumscribing the upper end 36 of housing 20 received within the water supply pipe 2, to prevent any leakage of water from the water supply pipe. The inner end 36 of the nipple housing 20, received within the water supply pipe 2, is of elongated cylindrical configuration and receives a flow restrictor element, generally designated 40, for restricting the flow of water from the water supply pipe 2 to the valve seat 23 of the nipple assembly 6.

FIGS. 3–5 more particularly illustrate the construction of the flow restrictor element 40. It includes a main body section 41 of cylindrical configuration formed with a labyrinth flow path 42 along its length. Such a labyrinth flow path may be of the type widely used in drip irrigation emitters to reduce the pressure from the inlet end 43 of the flow restrictor element 40 to its outlet end 44 so that even if a high pressure is at the inlet end, the flow will be at a relatively low rate at the outlet end.

The inlet end 43 of the flow restrictor element 40 is further formed with a plurality of axially-extending ribs and grooves, as shown at 45, to remove large dirt particles from the water before reaching the labyrinth 42. Similar ribs and grooves 46 are formed at the outlet end 44 to permit element 40 to be applied from either end. As shown particularly in FIG. 2, the inlet end 43 of the flow restrictor element 40 is of slightly reduced diameter, and engages an annular shoulder 47 in the inlet end 21 of the nipple housing 20, whereas the ,outer diameter of the main body section 41 is substantially the same as the inner diameter of extension 36 of the nipple housing 20. Thus, the flow restrictor element 40 may be inserted into housing 20 via the opposite end of the housing and retained with a friction fit within housing section 36.

As shown in FIG. 2, when the flow restrictor element 40 is so retained within housing section 36, its outlet end 44 is spaced from ball 29, to thereby define an outlet chamber 48 between the outlet end of the flow restrictor element 40 and ball 29. Chamber 48 thus accommodates ball 29 when it is lifted off the valve seat 23 by the tilting of pin 25 by poultry.

The operation of the nipple assembly illustrated in FIGS. 2–5 will be apparent from the above description.

In the normal condition of the nipple assembly, as illustrated in FIG. 2, ball 29 rests on valve seat 23 and therefore blocks the flow of water from the interior of the water supply pipe 2 through outlet 24 of the nipple housing 6. However, when pin 25 is tilted or lifted by poultry, this causes ball 29 to be lifted off at least a part of valve seat 23, thereby opening the flow of water from the interior of pipe 2, via the flow restrictor element 40, through clearance flow passageway 28, and out through the housing outlet 24. As soon as the tilting or lifting of the pin is terminated, the ball 29 returns to its normal position on valve seat 23, to again block the flow of water through the outlet 24.

The elongated flow passageway of the labyrinth flow path 42 of the flow restrictor element 40 is of substantially longer length than that of the clearance flow passageway 28, and thereby reduces the pressure of the water as it flows through the labyrinth. This enables the poultry drinker to be supplied with water at a relatively high pressure thereby making the poultry drinker system less sensitive to changes in elevation along the length of the water supply pipe 2, without requiring pressure regulators at frequent intervals if there are significant changes in elevation.

FIG. 6 illustrates another type of water flow restrictor element, therein designated 50, which may be used instead of flow restrictor element 40 of FIGS. 2–5.

Flow restrictor element 50 illustrated in FIG. 6 also includes a cylindrical body section 51 which may be received with a friction fit within the inner part 36 of the nipple housing 20. In this case, however, the elongated flow passageway is defined, not by a labyrinth as is FIGS. 2–5, but rather by a groove 52 extending helically around the periphery of the flow restrictor body 51. The upper end of flow restrictor element 50 is formed with an inlet 53 leading into the helical groove 52 from a cavity defining an inlet chamber 54, and the outlet end of the helical groove leads to an outlet 55 into another cavity 56 defining an outlet chamber communicating with outlet chamber 48 (FIG. 2) in the nipple housing.

It will thus be seen that the flow restrictor element illustrated in FIG. 6 also provides the same advantages as the flow restrictor element illustrated in FIGS. 2–5.

While the invention has been described with respect to two preferred embodiments, it will be appreciated that these art set forth merely for purposes of example, and that many other variations, modifications and applications of the invention may be made.

What is claimed is:

1. A water delivery assembly for attachment to a pressurized water supply pipe particularly useful for supplying drinking water to poultry, comprising:

a housing having an inlet receivable within the pressurized water supply pipe for inletting water therefrom, an outlet for outletting water from the housing, and a valve opening circumscribed by a valve seat between said inlet and outlet;

a valve member normally seated on said valve seat to block the flow of water via said valve opening to said outlet;

and a pin passing through a lodge in said housing with one end of the pin extending externally of the housing so as to be engageable by poultry for moving the valve member to an open position, the opposite end of said pin having an enlarged head seatable on said ledge, and a narrow portion between said head and externally-extending end of the pin defining a clearance flow passageway between the inner surface of said ledge and housing and the outer surface of said pin for the flow of water therethrough when the externally-extending end of the pin is engaged by a poultry to cause the enlarged head of the pin to unseat from the ledge and to move the valve member to its open position, thereby producing a flow of water via said clearance flow passageway to the housing outlet;

characterized in that said housing further includes a socket receivable within the pressurized water supply pipe, and a flow restrictor element removably received within said socket and having an inlet at one end receiveable within the water supply pipe, an outlet at the opposite end communicating with said valve opening, all elongated flow passageway of longer length than that of said flow restrictor element between said inlet and outlet of the flow restrictor element, and than that of said clearance flow passageway between said housing inlet and said clearance flow passageway restricting the water flow through said outlet, thereby permitting the assembly to be used with water supply pipes supplying water at a relatively high pressure.

2. The assembly according to claim 1, wherein said elongated flow passageway is in the form of a labyrinth extending the length of the flow restrictor element.

3. The assembly according to claim 1, wherein said elongated flow passageway is in the form of a helical groove extending helically around the periphery of said flow restrictor element.

4. The assembly according to claim 1, wherein said flow restrictor element is inserted with a friction fit into said socket.

5. The assembly according to claim 4, wherein said socket-and flow restrictor element are of cylindrical configuration.

6. The assembly according to claim 4, wherein said flow restrictor element is spaced from said valve member to define an outlet chamber between the valve member and flow restrictor element.

7. The assembly according to claim 6, wherein said valve member is movable by said pin into said outlet chamber to connect said outlet chamber to said housing outlet.

8. The assembly according to claim 7, wherein said flow restrictor element includes a plurality of ribs defining an inlet leading to said passageway.

9. The assembly according to claim 6, wherein said valve member is a ball valve normally seated on said valve seat but unseatable therefrom by said pin when lifted or tilted by poultry.

10. The assembly according to claim 9, wherein said pin includes an enlarged head normally seating said ball valve.

11. The assembly according to claim 1, wherein said housing includes a saddle clamp for attaching the housing to the pressurized water supply pipe.

12. A nipple assembly for attachment to a pressurized water supply pipe particularly useful for supplying drinking water to poultry, comprising:

a housing having an inlet receivable within the pressurized water supply pipe for inletting water therefrom, an outlet for outletting water from the housing, and a valve opening circumscribed by a valve seat between said inlet and outlet;

a valve member normally seated on said valve seat to block the flow of water via said valve opening to said outlet;

and a pin passing through a ledge in said housing with one end of the pin extending externally of the housing so as to be engageable by poultry for moving the valve member to an open position, the opposite end of said pin having an enlarged head seatable on said ledge, and a narrow portion between said head and externally-extending end of the pin defining a clearance flow passageway between the inner surface of said ledge and housing and the outer surface of said pin for the flow of water therethrough when the externally-extending end of the pin is engaged by a poultry to cause the enlarged head of the pin to unseat from the ledge and to move the valve member to its open position, thereby producing a flow of water via said clearance flow passageway to the housing outlet;

said housing further including a socket receivable within the pressurized water supply pipe, and a flow restrictor element removably received within said socket and having a first plurality of ribs at one end defining an inlet to said flow restrictor element, a second plurality of ribs at the opposite end of the flow restrictor element defining an outlet therefrom communicating with said valve opening, and an elongated flow passageway of longer length than that of said flow restrictor element between said inlet and outlet of the flow restrictor element, thereby permitting the nipple assembly to be used with water supply pipes supplying water at a relatively high pressure.

13. The nipple nipple assembly according to claim 12, wherein said elongated flow passageway is in the form of a labyrinth extending the length of the flow restrictor element.

14. The nipple assembly according to claim 12, wherein said elongated flow passageway is in the form of a helical groove extending helically around the periphery of said flow restrictor element.

15. The nipple assembly according to claim 12, wherein said flow restrictor element is inserted with a friction fit into said socket.

16. The nipple assembly according to claim 15, wherein said flow restrictor element is spaced from said valve member to define an outlet chamber between the valve member and flow restrictor element.

17. The nipple assembly according to claim 16, wherein said valve member is movable by said pin into said outlet chamber to connect said outlet chamber to said housing outlet.

18. The nipple assembly according to claim 12, wherein said valve member is a ball valve normally seated on said valve seat but unseatable therefrom by said pin when lifted or tilted by poultry.

* * * * *